(12) United States Patent
Weber et al.

(10) Patent No.: US 10,962,563 B2
(45) Date of Patent: Mar. 30, 2021

(54) DROPLET VELOCITY DETECTION

(71) Applicant: Bio-Rad Laboratories, Inc., Hercules, CA (US)

(72) Inventors: Aaron Weber, Arlington, MA (US); Tony Hung, Cambridge, MA (US); Sepehr Kiani, Watertown, MA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 173 days.

(21) Appl. No.: 16/246,298

(22) Filed: Jan. 11, 2019

(65) Prior Publication Data

US 2019/0146002 A1 May 16, 2019

Related U.S. Application Data

(63) Continuation of application No. 14/932,537, filed on Nov. 4, 2015, now Pat. No. 10,215,771.

(60) Provisional application No. 62/076,316, filed on Nov. 6, 2014.

(51) Int. Cl.
*G01P 5/18* (2006.01)
*G01P 5/20* (2006.01)
*G01P 5/26* (2006.01)

(52) U.S. Cl.
CPC .............. *G01P 5/18* (2013.01); *G01P 5/20* (2013.01); *G01P 5/26* (2013.01)

(58) Field of Classification Search
CPC ..... B41J 2/01; B41J 2/125; G01P 3/64; G01P 3/68
See application file for complete search history.

(56) References Cited

U.S. PATENT DOCUMENTS

| | | | | |
|---|---|---|---|---|
| 3,818,200 A | * | 6/1974 | Pilhofer | G01N 15/1459 356/335 |
| 2003/0071984 A1 | * | 4/2003 | Teramae | B41J 2/01 356/28 |
| 2006/0152722 A1 | * | 7/2006 | Northby | G01P 5/20 356/337 |
| 2011/0222051 A1 | | 9/2011 | Heng | |
| 2011/0303859 A1 | | 12/2011 | Lofstrom et al. | |
| 2012/0188531 A1 | | 7/2012 | Delville et al. | |
| 2014/0198313 A1 | | 7/2014 | Tracy et al. | |
| 2014/0212917 A1 | | 7/2014 | Durack et al. | |

FOREIGN PATENT DOCUMENTS

| | | |
|---|---|---|
| CN | 102906557 A | 1/2013 |
| GB | 1333794 A | 10/1973 |
| GB | 2295670 A | 6/1996 |
| WO | 00/63660 A2 | 10/2000 |
| WO | 2011/116003 A1 | 9/2011 |

OTHER PUBLICATIONS

PCT/US2015/059071, "International Search Report and Written Opinion", dated Feb. 26, 2016, 14 pages.

(Continued)

*Primary Examiner* — Luke D Ratcliffe
(74) *Attorney, Agent, or Firm* — Kilpatrick Townsend and Stockton LLP

(57) ABSTRACT

Methods and systems are provided for measuring a velocity of a droplet passing through a microfluidic channel.

5 Claims, 4 Drawing Sheets

(56) References Cited

OTHER PUBLICATIONS

Extended European Search Report and Search Opinion dated Feb. 22, 2018 from EP Application 15857631.4; 11 pages.
Parker, J. et al.; "Flare Metering with Optics From Blue-Sky Technology to the Real World"; Proceedings of the 25th International North Sea Flow Measurement Workshop; Oct. 16, 2007; Oslo, Norway; pp. 1-19.
de Saint Vincent, M. Robert, et al., "Real-Time Droplet Caliper for Digital Microfluidics," Microfluid Nanofluid, 2012, vol. 13, pp. 261-271.

* cited by examiner

DROPLET VELOCITY DETECTION

CROSS-REFERENCE TO RELATED PATENT APPLICATIONS

The present application is a continuation of U.S. patent application Ser. No. 14/932,537, filed Nov. 4, 2015, which claims benefit of priority to U.S. Provisional Patent Application No. 62/076,316, filed Nov. 6, 2014, which is incorporated by reference for all purposes.

BACKGROUND OF THE INVENTION

Microfluidic methods involve passing small volumes of fluid through microfabricated structures and manipulating these volumes to carry out biological or chemical reactions. To stage such reactions, samples, reactants, solvents, or other reagents can be encapsulated in discrete droplets having volumes on the order of nanoliters or less. A droplet is typically immersed in a carrier fluid from which it is phase-separated, and transported along with the carrier fluid through microfluidic channels. In sufficiently small channels, this transport occurs at low Reynolds number and exhibits laminar flow. Reactions can be facilitated by, for example, merging droplets (causing droplet fusion), splitting droplets (causing droplet fission), injecting material into droplets, or extracting material from droplets.

To control the movement of droplets in a microfluidic device, it can be useful to measure the velocities of droplets in real time as they pass through microfluidic channels. Similarly, for droplets subject to injection or extraction of material, it can be useful to measure the widths or volumes of these droplets at one or more points in a microfluidic channel. These measurements can be fed back to systems governing the flow rate of the carrier fluid or the manipulation of droplets, allowing optimization of droplet-based reactions. Measuring droplet velocity or size is challenging, however, because of the small dimensions of microfluidic devices and the droplets themselves. Imaging individual droplets with conventional optics requires a high level of magnification and a limited field of view. A droplet traveling through a microfluidic channel at typical velocities can traverse the field of view faster than two images of the droplet can be acquired in consecutive video frames. To obtain two or more images of the same droplet and measure a change, more sophisticated optics can be employed to expand the field of view, or a high-speed camera can be used instead of a conventional video camera. These solutions are expensive and difficult to implement.

BRIEF SUMMARY OF THE INVENTION

In a first aspect of the present invention, a method of measuring a velocity of a droplet passing through a microfluidic channel is provided. The microfluidic channel is interposed between a laser and a detector, and comprises a transparent illumination site. The laser is directed at the illumination site and the detector. The detector comprises a plurality of physically separated detection regions and is configured to generate a signal for each region, the signal being proportional to the intensity of light incident on the region. The method includes, while the droplet is absent from the illumination site: shining a laser beam emitted by the laser through the illumination site and onto the detector, wherein the laser beam is incident on a first region and a second region; measuring a first baseline signal for the first region, and measuring a second baseline signal for the second region. Further, while the droplet passes through the illumination site, the method includes: shining the laser beam through the illumination site and onto the detector; measuring a first signal for the first region; and measuring a second signal for the second region. The method also includes: determining a first departure time at which the first signal initially departs from the first baseline signal by a first predetermined amount; determining a second departure time at which the second signal initially departs from the second baseline signal by a second predetermined amount; calculating a difference between the first departure time and the second departure time to obtain an elapsed time; and determining a velocity based on the elapsed time, thereby measuring the velocity of the droplet passing through the microfluidic channel.

In some embodiments of the method, the first region of the detector or the second region of the detector comprises a single pixel or photodiode. In some embodiments, determining a velocity comprises dividing an appropriate distance by the elapsed time. In some embodiments, the first predetermined amount is at least 1, 2, 5, 10, 20, 30, 40, 50, 60, 70, 80 or 90 percent of the first baseline signal, or the second predetermined amount is at least 1, 2, 5, 10, 20, 30, 40, 50, 60, 70, 80 or 90 percent of the second baseline signal. In some embodiments, the first predetermined amount or the second predetermined amount is at least 1, 10, 100, 1,000, 10,000, 100,000, or 1,000,000 counts. In some embodiments, the first signal initially departs from the first baseline signal by falling below the first baseline signal by the first predetermined amount, or the second signal initially departs from the second baseline signal by falling below the second baseline signal by the second predetermined amount. In some embodiments, the first signal initially departs from the first baseline signal by exceeding the first baseline signal by the first predetermined amount, or the second signal initially departs from the second baseline signal by exceeding the second baseline signal by the second predetermined amount. In any of these embodiments, the first predetermined amount can be about equal to the second predetermined amount.

The method also includes, in some embodiments, determining a first recovery time at which the first signal initially recovers to the first baseline signal to within a first predetermined tolerance, the first recovery time occurring after the first departure time; calculating a difference between the first departure time and the first recovery time to obtain a first passage time; and multiplying the first passage time by the velocity to obtain a width of the droplet. In certain embodiments, the first predetermined tolerance is at most 50, 40, 30, 20, 10, 5, 4, 3, 2, 1, 0.5, 0.2, 0.1, 0.05, 0.02, or 0.01 percent of the first baseline signal. In certain embodiments, the first predetermined tolerance is at most 1,000,000, 100,000, 10,000, 1,000, 100, 10, or 1 count(s). The first predetermined tolerance can be about equal to the first predetermined amount. In these embodiments, the method can also include determining a second recovery time at which the second signal initially recovers to the second baseline signal to within a second predetermined tolerance; calculating a difference between the first recovery time and the second recovery time to obtain an additional elapsed time; and determining an additional velocity based on the additional elapsed time. The first predetermined tolerance can be about equal to the second predetermined tolerance.

In some embodiments of the method, determining an additional velocity of the droplet comprises dividing an appropriate distance by the additional elapsed time. In any embodiment, the appropriate distance can be a function of the distance between the first region and the second region on the detector.

In a second aspect of the present invention, a method of measuring a velocity of a droplet passing through a microfluidic channel is provided. The microfluidic channel is interposed between a laser and a detector, and comprises a transparent illumination site. The laser is directed at the illumination site and the detector. The detector comprises a plurality of physically separated detection regions and is configured to generate a signal for each region, the signal being proportional to the intensity of light incident on the region. The method includes shining a laser beam emitted by the laser through the illumination site and onto the detector, and identifying a first non-incident region and a second non-incident region of the detector, wherein the laser beam is not incident on either non-incident region when the droplet is absent from the illumination site. While the droplet passes through the illumination site, the method also includes measuring a first signal for the first non-incident region, and measuring a second signal for the second non-incident region. Further, the method includes determining a first increase time at which the first signal initially exceeds a first predetermined threshold; determining a second increase time at which the second signal initially exceeds a second predetermined threshold; calculating a difference between the first increase time and the second increase time to obtain an elapsed time; and determining a velocity based on the elapsed time, thereby measuring the velocity of the droplet passing through the microfluidic channel.

In this aspect, the first non-incident region or the second non-incident region can comprise a single pixel or photodiode. In some embodiments, the method further includes, while the droplet is absent from the illumination site, measuring a first dark signal for the first non-incident region, and measuring a second dark signal for the second non-incident region, wherein the first predetermined threshold is based on the first dark signal, and the second predetermined threshold is based on the second dark signal. In these embodiments, the first predetermined threshold can be a multiple of at least 1.1, 1.2, 1.5, 2, 5, 10, 20, 50, or 100 of the first dark signal, or the second predetermined threshold can be a multiple of at least 1.1, 1.2, 1.5, 2, 5, 10, 20, 50, or 100 of the second dark signal.

In some embodiments, the first predetermined threshold or the second predetermined threshold is at least 1, 10, 100, 1,000, 10,000, 100,000, or 1,000,000 counts. The first predetermined threshold can be about equal to the second predetermined threshold. In some embodiments, determining a velocity comprises dividing an appropriate distance by the elapsed time. The appropriate distance can be a function of the distance between the first non-incident region and the second non-incident region of the detector.

In embodiments of the present methods, according to the first or second aspect of the invention, the appropriate distance can be the width of the illumination site, and/or the laser beam can be focused at the illumination site.

In a third aspect of the present invention, a system for measuring the velocity of a droplet passing through a microfluidic channel is provided. The system includes a laser, a microfluidic channel, and a detector. The microfluidic channel includes a transparent illumination site and is interposed between the laser and the detector. The laser is directed at the microfluidic channel and the detector, such that a laser beam emitted by the laser intersects the microfluidic channel at the illumination site and is transmitted by the microfluidic channel to the detector. The detector comprises a plurality of physically separated detection regions and is configured to generate a signal for each region, the signal being proportional to the intensity of light incident on the region. In the absence of a droplet at the illumination site, the laser beam is incident on at least two regions of the detector.

In some embodiments, the system further includes focusing optics, wherein the focusing optics are interposed between the laser and the microfluidic channel, such that the laser beam is focused at the illumination site. In some embodiments of the system, the detector includes at least two non-incident regions, such that the laser beam is not incident on each non-incident region in the absence of a droplet at the illumination site.

DETAILED DESCRIPTION OF THE INVENTION

I. Introduction

Figure 1:
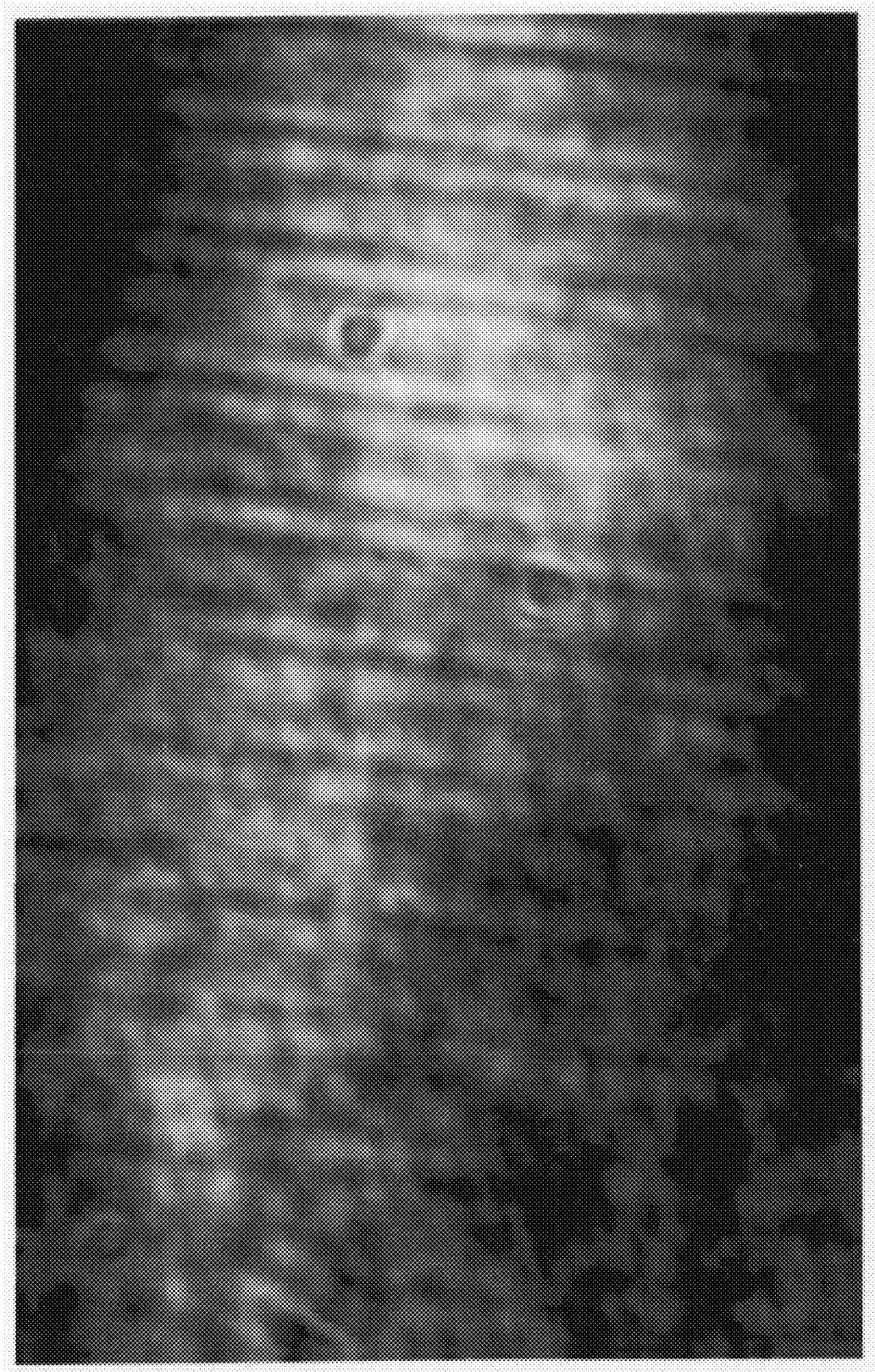
FIG. 1 shows a microfluidic channel imaged with a high speed camera. Droplets are passing through the microfluidic channel. A laser beam transmitted by the microfluidic channel is incident on the camera.

The inventors have discovered that the velocity of a droplet passing through a microfluidic channel can be measured by shining a laser beam through a transparent portion of the channel and onto a detector. The detector comprises a plurality of physically separated detection regions, and each region can generate a time-series signal that is proportional to the intensity of laser light incident on the region. In the absence of a droplet in the transparent portion of the channel, also called the illumination site, the laser beam falls on at least two regions of the detector. As the droplet passes through the illumination site, it can cause the laser beam to be deflected away from these regions as a result of absorption, scattering, lensing, or refraction. Thus, changes (for example, decreases) in the signals from the two or more detection regions can be correlated with passage of the droplet through the channel. The signal from a first region changes before the signal from a second region because the droplet takes measurable time to traverse the width of the laser beam in the illumination site, and reaches the portion of the laser beam incident on the first region before it reaches the portion incident on the second region. By measuring the time when the signal from the first region changes by a certain predetermined amount, the time when the signal from the second region changes comparably, and the difference between these times, the time needed for the droplet (or a portion thereof) to travel between two points in a cross-section of the laser beam can be determined. The distance between these points will be known or can be determined, based on the size of the illumination site, the geometry of the optical path, the distance between the regions of the detector, or other factors. The velocity of the droplet can then be calculated by dividing the distance between the two points by the time taken for the droplet to travel between them.

The inventors have further found that the velocity of a droplet can be calculated based on the times at which the signals from the two detection regions recover to their baseline levels, which can be recorded before the droplet enters the illumination site. Changes in the signals during transit of the droplet across the illumination site can also be used to calculate the width of the droplet and other information. In addition, droplet velocities can be measured using signals from "non-incident" detection regions, which are not in the path of the laser beam in the absence of a droplet in the illumination site, but receive deflected light as a droplet passes through the illumination site. Provided herein are methods and systems for measuring the velocity of the droplet passing through the microfluidic channel.

II. Definitions

"Velocity" refers to the directed rate of movement of an object. In the case of a microfluidic droplet, velocity can be specified in terms of the rate and direction the droplet is moving within a channel (e.g., 10 µm/s to the right or 50 µm/s downstream). Velocity can be measured or specified for the object as a whole, a portion of the object, or a point on the object, for example the center or the trailing edge. The velocity of an object can be specified in absolute (e.g., 1 mm/s) or relative (e.g., twice as fast as another object) terms, and with respect to any convenient reference frame.

"Microfluidic channel" refers to channel or vessel, no more than about five millimeters across in its narrowest dimension, for carrying or holding a fluid.

"Detection region" (equivalently, "detector region" or simply "region") refers to a portion of a light-sensitive detector, for example a pixel or group of pixels. Alternatively, a detection region can be an entire light-sensitive detector. Detection regions can be physically separated from each other, meaning that they occur in separate locations from each other and can receive light originating from different locations.

The words "initial" or "initially", as used herein, refer to the first discernible time at which an event occurs or a condition is true. For example, the time at which signal A initially exceeds signal B is the first time at which signal A is measured to be greater than signal B. This time can reflect the resolution of any instruments with which the measurements are made. An initial time is distinct from later times at which the condition remains true, e.g. times at which signal A remains in excess of signal B.

The terms "about" and "approximately equal" are used herein to modify a numerical value and indicate a defined range around that value. If "X" is the value, "about X" or "approximately equal to X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

III. Methods

A. Optical and Microfluidic Configuration

According to embodiments of the present invention, methods are provided for measuring a velocity of a droplet passing through a microfluidic channel. The microfluidic channel is interposed between a laser and a detector, and includes a transparent illumination site. The laser is directed at the illumination site and the detector, and is configured to emit a laser beam.

The microfluidic channel employed in the present methods can be of any dimensions and can be part of a larger microfluidic device, such as a chip. Suitable materials in which the microfluidic channel can be disposed, or that can form the walls of the channel, include glass, ceramics, plastics, and polymers. The microfluidic channel can be optically transparent along some or all of its length so that the laser beam can be transmitted by the channel to the detector. In some embodiments, all materials immediately surrounding the channel are transparent. In other embodiments, the microfluidic channel is disposed in an opaque material, with a portion of this material being replaced with a transparent window or insert to transmit the laser beam. The illumination site can occur or be designated at any location where the microfluidic channel is transparent. It will be appreciated that complete transparency of the illumination site is not necessary in all embodiments to achieve acceptable transmission of the laser beam through the microfluidic channel, or for the detected laser beam to indicate the passage of a microfluidic droplet through the microfluidic channel. In some embodiments, the illumination site is semi-transparent, translucent, or semi-opaque, or transmits different wavelengths of light with different efficiencies. For example, the illumination site can include a material that selectively passes wavelengths of light emitted by the laser and filters out other wavelengths.

The laser trained on the microfluidic channel and detector can be chosen and configured as desired. Preferably, the laser is operated at a power such that the beam does not damage the microfluidic channel, such as through heating, ablation, or light-mediated chemical reactions, over the operational lifetime of the channel. Further, the laser preferably does not damage microfluidic droplets, the contents of these droplets, or other fluid species in the channel, or perturb the motion of droplets through trapping forces. Examples of lasers suitable for use in the present methods are gas lasers (e.g., helium-neon or argon-ion lasers), solid-state lasers, fiber lasers, and diode lasers. The laser can emit light in the visible, infrared, or ultraviolet portions of the electromagnetic spectrum. The laser preferably operates in continuous wave mode, or emits pulses that are of sufficiently short duration or high frequency that no measurable movement of the droplet occurs between pulses. Such pulses can be several orders of magnitude shorter in duration than the time needed for a drop to traverse the illumination site or move the width of the laser beam. Suitable pulse durations are on the order of nanoseconds to femtoseconds.

The detector used in the present methods can be selected and configured as appropriate for the laser. For example, a detector capable of detecting red light can be used in conjunction with a 633 nm helium-neon laser. Similarly, a detector for detecting blue light can be paired with a 488 nm diode laser. The detector includes multiple spatially separated detection regions that are sensitive to the laser light, and generates a signal for each of these regions that is proportional to the incident light intensity. In some embodiments, the detector comprises pixels arranged in a two-dimensional array, and the regions are individual pixels or groups of pixels. For example, a detection region can include 1, 2, 3, 4, 5, 10, 20, 50, 100, 200, 500, 1000, or more pixels. In some embodiments, a detection region includes a single pixel, or at most 1, 2, 3, 4, 5, 10, 20, 50, 100, 200, 500, or 1000 pixels. In some embodiments, the detector is a photodiode array (e.g., a linear photodiode array), and the regions are individual elements (e.g., photodiodes or pixels) or groups of elements in the array. For example, a detection region can include at least 1, 2, 3, 4, 5, 10, 20, 50, 100, 200, 500, or 1000 elements, or at most 1, 2, 3, 4, 5, 10, 20, 50, 100, 200, 500, or 1000 elements, in a photodiode array. A region also can be designated as a macroscopic portion of an array, or as portion of a light-sensitive surface of the detector. For example, a region can be a half or quadrant of this surface. Each region can have any desired shape or size. For example, a region can be approximately circular (e.g., a group of pixels arranged in a circle), square, or rectangular, and can have an average or maximum width of at least 0.01, 0.1, 1, 10, or 100 millimeters.

The signals output by the detector for separate detection regions can be independent of each other or can be coupled, depending on factors such as the electronic configuration of the detector. If the signals are coupled, they can be processed to provide separate or approximately independent intensities for the light-sensitive regions. The detector signals can be output continuously over time or can be discretely sampled, in which case any desired sampling frequencies, frame rates, exposure times, or integration times can be used. Generally, the detector provides quantitative time-series information about the intensity of light at each detection region, over timescales that are short relative to the movement of a droplet through the illumination site in the microfluidic channel.

The detector can be part of a video camera or still camera. In some embodiments, the detector is a high-speed camera (FIG. 1). In some embodiments, the detector includes a charge-coupled device (CCD) or a complementary metal-oxide-semiconductor (CMOS) image sensor. Alternatively, the regions can be photodiodes placed near each other, for example in a linear photodiode array. Variants of and alternatives to these types of image sensors will be apparent to those of skill in the art.

Signals output by the detector can be processed online (e.g., in real time) or offline. In the latter case, the signals can be saved to a computer storage medium for later processing. Signal processing can include standard procedures such as smoothing, filtering, sampling, and digitization. Signal processing can also include quantitative comparisons between measured signals, or comparisons between a measured signal and one or more numeric values, at various time points. In some embodiments, signal processing is performed using a computer system.

The microfluidic channel, laser, and detector can be arranged as desired according to the present methods. For example, any distances can be established among the laser, microfluidic channel, and detector. A straight optical path can be employed, or the laser beam can follow a bent or folded path by traveling through an optical fiber or reflecting off of mirrors, for example. If desired, one or more lenses can be placed in the optical path to focus or defocus the laser beam, change the beam profile, or otherwise condition the laser light for better detection of droplets passing through the microfluidic channel. For example, a pair of lenses forming a telescope or microscope can be used to set the width of the beam to a desired size at the illumination site or at the surface of the detector. In some embodiments, one or more lenses are placed immediately after the laser to focus the beam, so that the laser beam intersects the microfluidic channel at the beam waist. In some embodiments, the beam is focused or narrowed at the surface of the detector so that it is incident on a small area of the detector, for example a small number of pixels, with this area including two or more detection regions. Other optics, such as prisms, diffraction gratings, or irises can be used instead or in addition to lenses or mirrors. Optics can be placed between the laser and microfluidic channel, between the microfluidic channel and the detector, or in both locations.

B. Droplet Velocity Measured Using Departure Times

When the laser is turned on, the emitted laser beam intersects the microfluidic channel at the illumination site and is transmitted by the illumination site to the detector. In the absence of a droplet at the illumination site, the laser beam is incident on at least two regions of the detector, i.e. a first region and a second region. These regions can be adjacent to each other or can be separated. If separated, an unused portion of the detector (for example, a set of pixels for which no signals are measured) can occur between the two regions. Alternatively, an optically absorbent or non-reflective (e.g., dark-colored) material can be placed between the first region and second region. This material can be part of a beam block, beam stop, or beam trap. Other alternatives are to impose an air gap or electrically insulating material between the detection regions. In preferred embodiments, the detection regions do not overlap. For example, if the detector comprises pixels, the first region and second region do not share pixels. Any distance can exist between two regions or portions thereof. For example, the center pixels, centers, or facing edges of two detection regions can be separated by at least 0.01, 0.1, 1, 10, or 100 millimeters. If the laser beam is incident on more than two regions, then these regions can be arranged in any desired geometry (for example, in a line or triangle) within the detector.

In preparation for measuring droplet velocities in the microfluidic channel, baseline signals are measured for the two detection regions on which the laser beam is incident. The baseline signal for a region indicates the intensity of the portion of the laser beam falling on that region when droplets are absent from the illumination site. In some embodiments, the baseline signal is constant or approximately constant over time. A baseline signal can be measured for each region when the microfluidic channel is filled with the carrier fluid or another fluid having a similar index of refraction. For example, if hydrophobic droplets are carried through the microfluidic channel in an aqueous solution, then baseline signals can be measured when the channel is filled with the same aqueous solution, a solution having the same solutes or solute concentrations as the aqueous solution, or with water. Alternatively, if aqueous droplets are carried through the microfluidic channel in an oil-based carrier fluid, then baseline signals can be measured with the channel containing the same or a similar fluid. Baseline signals can also be measured while droplets are traveling through the microfluidic channel, provided the droplets are not within the illumination site while the measurements are made. The baseline signals can be measured before or after droplets pass through the illumination site, and can be measured over any desired time period or number of exposures. If desired, a baseline signal can be averaged over time or exposures to obtain a representative intensity of the laser beam at a particular detection region.

The laser power, detector gain, and/or exposure time are preferably adjusted to provide, for each detection region, a baseline signal value that is near the middle or upper end of the signal's dynamic range. Thus, changes (particularly decreases) in the amount of laser light incident on the region will register as changes in the value of the signal, with the amount of light and value of the signal remaining quantitatively correlated. If, on the other hand, the baseline signal for a region is near the lower end of the dynamic range, then a decrease in the intensity of light incident on the region can cause the signal to flat-line or roll over, making quantification of this decrease difficult.

While the laser beam is shining through the microfluidic channel and onto the detector, the velocities of one or more droplets passing through illumination site can be measured. According to the present methods, droplets can be formed, introduced into the microfluidic channel, and driven through the channel using any desired mechanisms. For example, the channel can be coupled to a pump or pipette to introduce samples and/or regulate flow. As a droplet passes through the illumination site, the signal for each of the at least two detection regions is measured and compared with the baseline signal. Preferably, each signal is measured multiple times (e.g., at least 10, 20, 50, 100, 200, 500, 1,000, 2,000, 5,000, or 10,000 times), with sufficiently short measurements and times between measurements to observe different behaviors in the signals. Each signal is expected to depart from the baseline signal as the droplet blocks, deflects, or otherwise disturbs the portion of the laser beam incident on the corresponding detection region. Further, the signals are expected to depart from the respective baseline signals at different times according to the time needed for the droplet to cross the width of the laser beam in the illumination site.

Figure 2:
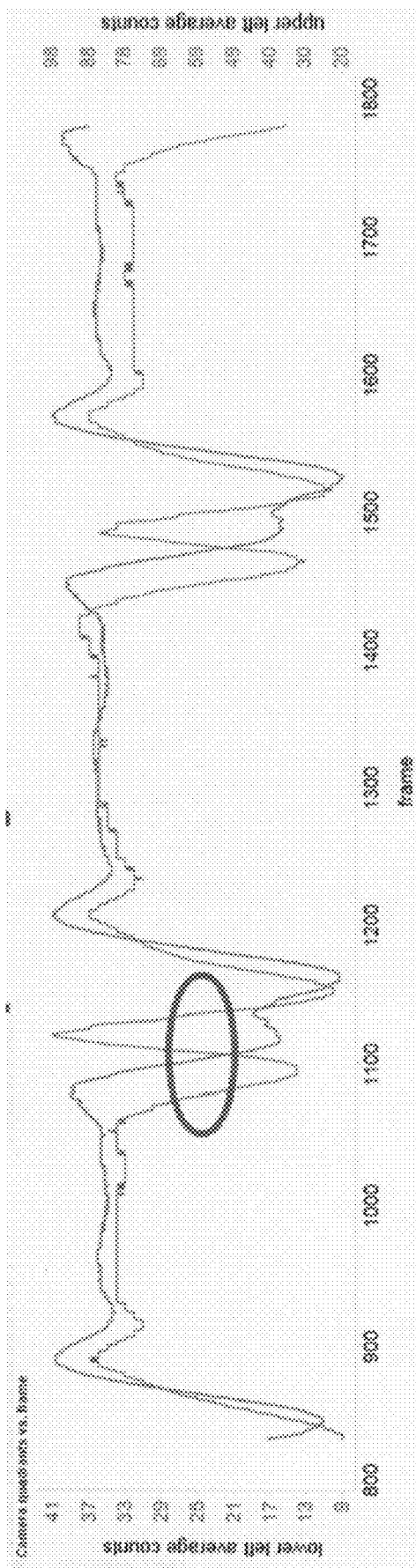
FIG. 2 shows time-series data for two detection regions of a light-sensitive detector. The detector is a linear photodiode array, and each detection region is a single element (pixel) in the array. The circled portion shows the signals measured for the two regions departing from baseline signals.

The current methods therefore include determining departure times, where the departure time for one detection region is the time at which the signal for that region initially departs, or first differs, from the baseline signal by a predetermined amount. A first departure time is determined for a first region, and a second departure time is determined for a second region. If the droplet crosses into the portion of the laser beam incident on the first region before it crosses into the portion incident on the second region (for example, if the first portion is located upstream of the second portion in the illumination site), then the first departure time will occur before the second departure time (FIG. 2). Therefore, a difference between the first departure time and second departure time can be calculated (for example, by subtracting the first departure time from the second departure time) to obtain an elapsed time. This elapsed time reflects the time needed for the droplet (or a part thereof) to move through the cross-section of the laser beam in the illumination site, between the portions of the beam incident on the first and second regions of the detector.

Any convenient criteria can be used for selecting the predetermined amounts used to determine the departure times. The predetermined amount for the first or second detection region is the amount by which the signal for that region initially departs from the baseline signal at the first or second departure time, respectively. In some embodiments, the first predetermined amount is a percentage of the baseline signal measured for the first region, or the second predetermined amount is a percentage of the baseline signal measured for the second region. For example, the first predetermined amount can be at least 1, 2, 5, 10, 20, 30, 40, 50, 60, 70, 80 or 90 percent of the baseline signal. In this example, at the first departure time, the signal for the first region differs from (exceeds or falls below) the baseline signal by at least 1, 2, 5, 10, 20, 30, 40, 50, 60, 70, 80 or 90 percent. In some embodiments, the first predetermined amount or the second predetermined amount is a number of counts, for example at least 1, 10, 100, 1,000, 10,000, 100,000, or 1,000,000 counts. "Counts" can refer to a number of photons or other unit of light intensity detected at the detection region during a certain period, e.g. an exposure or integration time. Thus, the number of counts registered by the region for such a period, as the droplet passes through the illumination site, can be compared with the number registered for a period of equal or similar duration during measurement of the baseline signal. The first departure time, for example, can occur when the number of counts registered for the first region during one exposure, acquired when the droplet is present in the illumination site, differs from that registered during an exposure when the droplet is absent. The difference in counts used as the predetermined amount can be set as desired and as appropriate for the detector.

For each of the at least two detection regions of the detector, the signal can be considered to initially depart from the baseline signal when it initially exceeds or falls below the baseline signal by the appropriate predetermined amount. Thus, passage of the droplet through the illumination site can be indicated by either an increase or a decrease in the detected signal. The signal detected at one region can increase if the laser light interacts with the droplet in such a way that the intensity of light incident on the region is greater than the intensity measured in the absence of the droplet. This can happen, for example, if the droplet acts as a lens for the laser light, or the laser light refracts as it passes through the droplet. On the other hand, the signal detected at a detection region can decrease if the droplet diverts laser light intersecting the illumination site away from that region or diffuses the light. As shown in FIG. 2, the signal for a region can increase and then decrease in turn as the droplet passes through the illumination site. Either the increasing or decreasing phase of the signal time-series can be used to determine the first or second departure time.

Preferably, similar criteria are used to determine when the signals for the first and second detection regions initially depart from the respective baseline signals. For example, if the first departure time occurs when the signal for the first region falls below the baseline signal by a predetermined amount (i.e., the signal decreases), then the second departure time can occur when the signal for the second region falls commensurately. Thus, both the first and second departure times are based on the signals for the respective detection regions decreasing. In some embodiments, the changes in the signals used to determine the first and second departure times have the same sign or magnitude. The first predetermined amount can be about equal to the second predetermined amount.

Once an elapsed time has been obtained, an uncalibrated or relative velocity of the droplet can be calculated by taking the reciprocal of the elapsed time. The relative velocity can be this reciprocal taken alone, multiplied by a constant, subjected to a linear transformation, or transformed by another appropriate function. The elapsed times or relative velocities of droplets can be compared to identify changes in the flow rate in the microfluidic channel. For example, droplets A and B pass through the illumination site at different times, and the elapsed time measured for droplet A is half that measured for droplet B. If droplets A and B are assumed to have the same size, then droplet A has twice the relative velocity of droplet B and is traveling twice as fast.

To determine the absolute velocity for a droplet, an appropriate distance can be divided by the measured elapsed time. The appropriate distance corresponds to the distance between the positions in the illumination site where the droplet is transiently located at the first and second departure times. These positions can occur within a cross-section of the laser beam in the illumination site, and can represent the centroid of the droplet, the leading or trailing edge of the droplet, or another part of the droplet.

Figure 3:
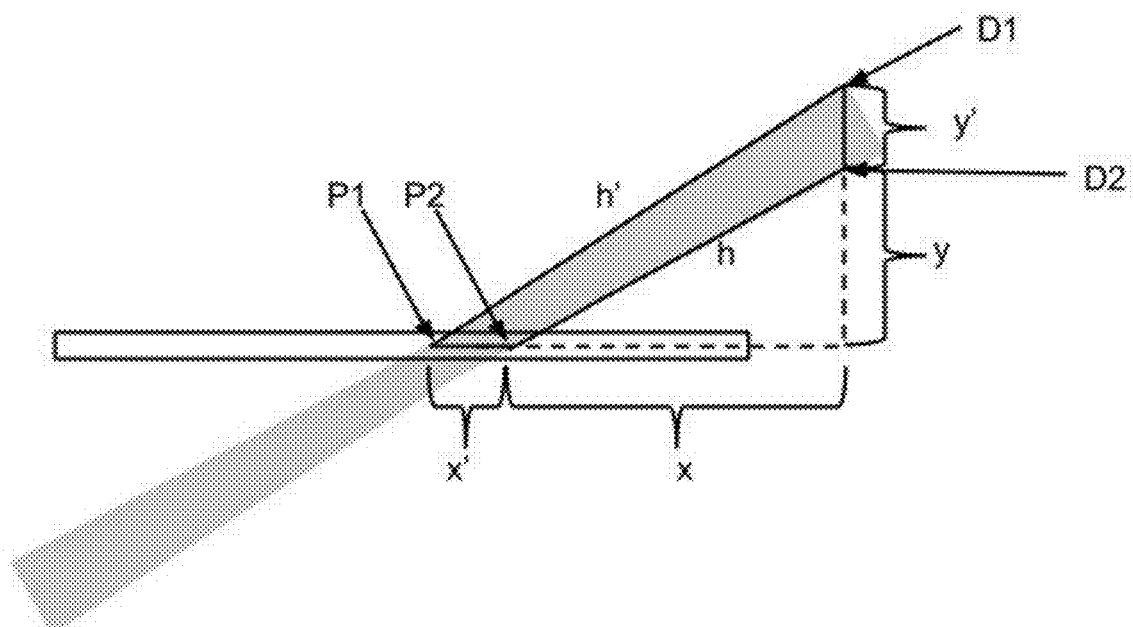
FIG. 3 shows a laser beam transmitted by a microfluidic channel and incident on a detector. The laser beam intersects the microfluidic channel at the beam waist and is oriented at an angle with respect to the microfluidic channel and detector. Geometrical relationships between points on the microfluidic channel and detector are indicated.

The appropriate distance can be calculated or estimated as desired. In some embodiments, the appropriate distance is estimated as the width of the laser beam at the illumination site, or the width of the illumination site itself. In some embodiments, the appropriate distance is a function of the distance between the first and second detection regions on the detector. This intra-region distance can be determined with knowledge of the spacing and geometrical disposition between pixels (e.g., pixels of the same color) on the detector. The spacing can be disclosed by the manufacturer of the detector or can be measured directly using a microscope. The appropriate distance can then be calculated based on the intra-region distance and the geometry of the optical train (FIG. 3). For example, the intra-region distance can be scaled up or down, as appropriate, to take into account any magnification of the laser beam occurring between the illumination site and detector, or any angles between the optical path, microfluidic channel, and detector, to arrive at the appropriate distance.

C. Droplet Velocity and Width Measured Using Recovery Times

As the droplet exits the illumination site, the droplet no longer perturbs the laser beam or affects the intensity of laser light registered at regions of the detector. Accordingly, the signals for the first and second detection regions can 'recover', or return to their respective baseline values. The times at which these signals initially recover provide further information about the droplet and its movement through the microfluidic channel. This information can complement the velocity of the droplet measured as described above, using the departures of these signals from the baseline values.

In some embodiments of the present methods, a first recovery time is determined. The first recovery time is the time at which the signal for the first detection region initially recovers to the baseline signal to within a first predetermined tolerance, and occurs after the first departure time (FIG. 2). The first predetermined tolerance is included to address the possibility that the signal for the first detection region may not fully recover to the baseline signal, within an acceptable amount of time or at all, after the droplet passes through the illumination site. A full recovery may not occur due to noise in the signal for the first region or drift in this signal over time. In addition, if multiple droplets are passing through the illumination site in succession, the signal may not have time to fully recover or stabilize at the baseline value before it departs again, as the next droplet enters the illumination site.

Like the first predetermined amount, the first predetermined tolerance can be selected as desired. In some embodiments, the first predetermined tolerance is a percentage of the baseline signal measured for the first detection region. For example, the first predetermined tolerance can be at most 50, 40, 30, 20, 10, 5, 4, 3, 2, 1, 0.5, 0.2, 0.1, 0.05, 0.02, or 0.01 percent of the baseline signal measured for the first region. In some embodiments, the first predetermined tolerance is a number of counts as discussed above, for example at most 1,000,000, 100,000, 10,000, 1,000, 100, 10, or 1 count(s). The signal for the first detection region is considered to be within the first predetermined tolerance of the baseline signal when the signal differs from the baseline signal by an amount less than or equal to the first predetermined tolerance. As desired, the first predetermined tolerance can allow for the signal for the first detection region to be larger than the baseline signal measured for the first region, smaller, or both. In some embodiments, the first predetermined tolerance is about equal to the first predetermined amount.

Once the first recovery time has been determined, a difference between the first departure time and the first recovery time can be calculated (for example, by subtracting the first departure time from the first recovery time) to obtain a first passage time. The first passage time is an estimate of the time taken by the droplet (or part of the droplet) to pass through the portion of the laser beam that, after exiting the illumination site of the microfluidic channel, is incident on the first detection region. It will be recognized that the first passage time is sensitive to the first predetermined amount and the first predetermined tolerance, and may underestimate the transit time of the droplet through the portion of the laser beam if these parameters are set too high. The first passage time can be multiplied by the velocity of the droplet to obtain a width of the droplet. For example, if the first passage time is 0.01 seconds, and the velocity of the droplet is measured to be 100 millimeters per second, then the width of the droplet can be estimated as 1 millimeter.

In some embodiments, a second recovery time is also determined. The second recovery time is the time at which the signal for the second detection region recovers to the baseline signal to within a second predetermined tolerance, and occurs after the first recovery time. The second predetermined tolerance is analogous to the first predetermined tolerance discussed above, but for the second detection region, and also can be selected as desired. In some embodiments, the first predetermined tolerance is about equal to the second predetermined tolerance.

Figure 4:
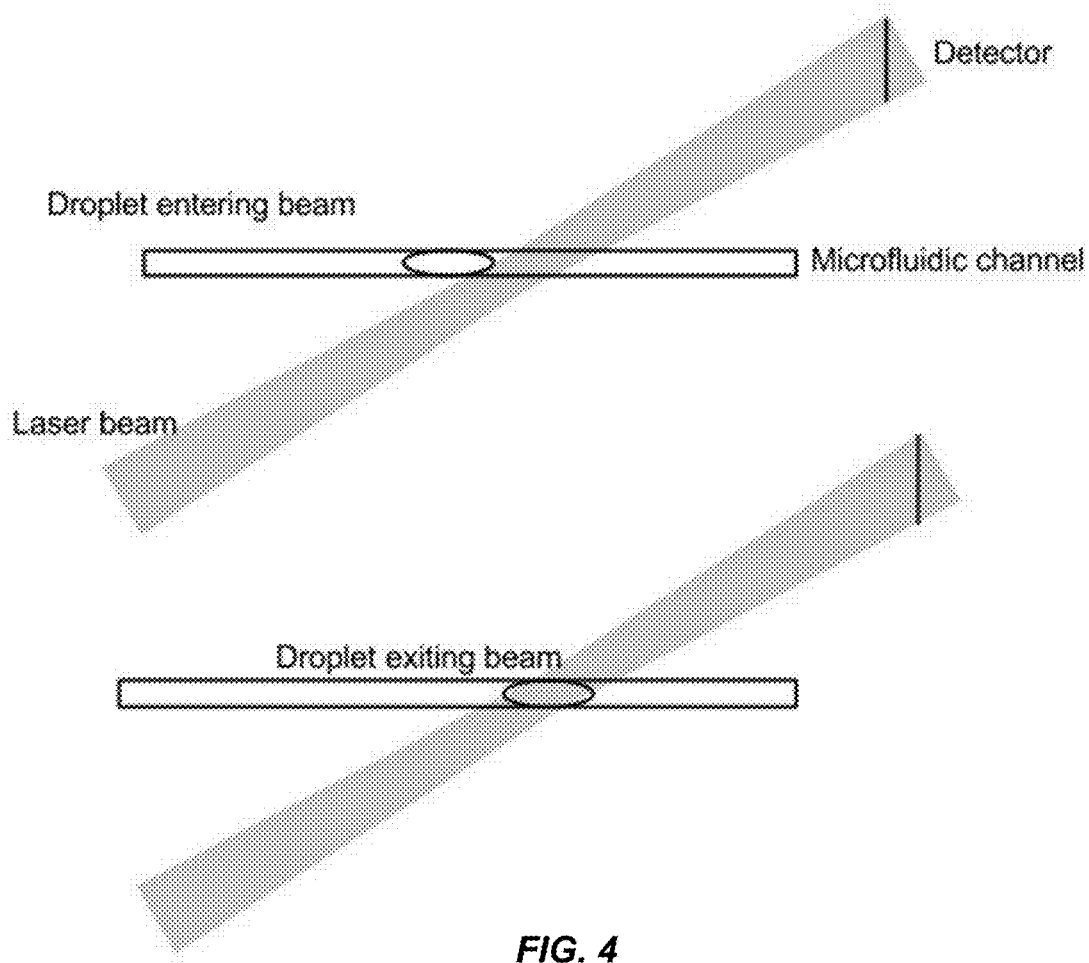
FIG. 4 shows a laser beam focused in a microfluidic channel and illuminating a detector. A droplet is moving through a cross-section of the laser beam such that the front of the droplet moves from one edge of the beam to the other edge.

Once the recovery times have been determined, a difference between the first recovery time and the second recovery time can be calculated to obtain an additional elapsed time. The result is similar to the elapsed time calculated using the departure times, and indicates the amount of time taken by the droplet to pass through a cross-section of the laser beam in the illumination site. Whereas departure times may indicate when the droplet arrives at the portions of the laser beam incident on the first and second detection regions, the recovery times may indicate when the droplet leaves these portions. Thus, the elapsed time calculated using the departure time may represent the position and movement of the leading edge of the droplet, while the additional elapsed time calculated using the recovery times may represent the position and movement of the trailing edge of the droplet (FIG. 4). Regardless, the additional elapsed time can be included in the present methods in the same way as the elapsed time discussed above. For example, an additional velocity can be determined by taking the reciprocal of the additional elapsed time. The additional velocity can be compared or averaged with the velocity determined from departure times to obtain a composite velocity of the droplet.

If desired, the additional velocity can be obtained by dividing an appropriate distance by the additional elapsed time. Here, the appropriate distance corresponds to the distance between the positions in the illumination site where the droplet is located at the first and second recovery times. This appropriate distance can be assumed to be the same as the distance between the droplet positions at the first and second departure times. Thus, the same value for appropriate distance, calculated or estimated as discussed above, can be divided by different measurements of elapsed time to obtain different measurements of droplet velocity.

D. Droplet Velocity Measured Using Increase Times

The present methods can also involve monitoring regions of the detector that are in the path of the laser beam only as a result of droplets in the illumination site diverting light to these regions. Such regions are called "non-incident regions" herein, and are distinct from any detection regions (e.g., the first region and the second region discussed above) on which the laser beam is incident in the absence of a droplet at the illumination site. In some embodiments, the detector includes at least two non-incident regions (i.e., a first non-incident region and a second non-incident region). The detector generates a signal for each non-incident region, with the signal being proportional to the intensity of light incident on the non-incident region. The signal, if it rises to a certain level, can indicate a droplet passing through the illumination site, and can provide information about the size and movement of the droplet.

The non-incident regions can occur anywhere on the detector—for example, adjacent to or removed from the first and second regions discussed above, and with any distances between or among them. In some embodiments, each non-incident region is separated by at least 0.01, 0.1, 1, 10, 100, or 1000 millimeters from any detection region on which the laser beam is incident in the absence of a droplet at the illumination site. In some embodiments, a first non-incident region and a second-non incident region are at least 0.01, 0.1, 1, 10, 100, or 1000 millimeters apart. The non-incident regions can be identified as desired, for example by monitoring the signals of pixels on the detector and identifying those undergoing changes as droplets pass through the illumination site. Alternatively, the non-incident regions can be designated to detect particular angles or directions of light deflected by droplets.

To measure the velocity of a droplet using non-incident regions, the present methods can include measuring a dark signal for each non-incident region when droplets are absent from the illumination site, and while the laser beam is shining. The dark signals are similar to the baseline signals discussed above in that they represent the intensities of light received by regions of the detector while the laser beam is not perturbed by droplets. In the case of non-incident regions, the dark signals represent any ambient light illuminating the detector, plus any small amounts of laser light that may reach these regions by random scattering. Dark signals can be measured while the microfluidic channel is filled with carrier fluid, or while droplets are passing through the microfluidic channel but remain outside of the illumination site. The dark signal value for a non-incident region can be measured by averaging the signal generated for the region over time or over multiple exposures. Preferably, the detector gain and/or exposure time are adjusted to provide, for each non-incident region, a dark signal value that is near the bottom of the signal's dynamic range. Thus, the detector is sensitive to increases in the intensity of light arriving at each non-incident region.

The methods also include, while the laser beam is shining, measuring a signal for each of the at least two non-incident regions as the droplet passes through the illumination site. The signals for the non-incident regions are sampled continuously or repeatedly so that changes in these signals over time can be discerned. It is expected that the signals will transiently increase as the droplet diverts light to the non-incident regions. Furthermore, it is expected that the signals will increase at different times or by different amounts, because the light diverted to each of these regions may originate from a different part of the cross-section of the laser beam in the illumination site. The velocity of the droplet can be measured by determining when the signals for the non-incident regions have exceeded predetermined thresholds, for example by comparing these signals to the respective dark signals.

For two of the non-incident regions, increase times are determined. The first increase time is the time at which the signal for a first non-incident region initially exceeds a first predetermined threshold. Similarly, the second increase time is the time at which the signal for a second non-incident region initially exceeds a second predetermined threshold, where the second increase time occurs after the first increase time. If desired, the predetermined thresholds can be set in terms of the dark signals for the first and second non-incident regions. For example, in some embodiments, the first (or second) predetermined threshold is a multiple of the dark signal measured for the first (or second) non-incident region. The multiple can be at least 1.1, 1.2, 1.5, 2, 5, 10, 20, 50, or 100, or any other value that represents a significant increase in the signal above the dark signal. In some embodiments, the first or second predetermined threshold is a number of counts, for example 1, 10, 100, 1,000, 10,000, 100,000, or 1,000,000 counts. This number can exceed that for the corresponding dark signal by any appropriate amount. In some cases, the predetermined threshold for a non-incident region is set empirically, by observing how the signal for that region changes as one or more droplets pass through the illumination site. The first predetermined threshold can be about equal to the second predetermined threshold.

An elapsed time for the droplet passing through part of the illumination site can then be obtained by calculating a difference between the first increase time and the second increase time. This elapsed time represents the time taken by the droplet to move between two locations in the cross-section of the laser beam, where at each location the droplet diverts sufficient light to one of the non-incident regions to surpass the respective predetermined threshold. A velocity can then be determined based on the elapsed time, thus yielding a measurement of the velocity of the droplet. For example, one can take the reciprocal of the elapsed time to obtain an uncalibrated or relative velocity, which can be compared with relative velocities determined using different methods and/or for different droplets. If desired, an appropriate distance can be divided by the elapsed time to determine a velocity. The appropriate distance in this context can be assumed to be the same as the appropriate distance discussed above. For example, the appropriate distance can be width of the cross-section of the laser beam at the illumination site, or the width of the illumination site itself. Alternatively, the appropriate distance can be calculated as a function of the distance between the first non-incident region and the second non-incident region on the detector. For example, the intra-region distance can be scaled up or down, as appropriate for the geometry of light traveling between the illumination site and the non-incident regions of the detector, to obtain the appropriate distance.

E. Comparisons of Velocities

The velocity of a droplet passing through the illumination site of a microfluidic channel can be measured using any or all of the methods presented herein. These methods include using departure times, recovery times, and increase times. All of these times can be determined for a single droplet if signals for two or more detection regions on which the laser beam is incident, as well as two or more non-incident regions, are monitored during passage. Velocities measured using two or more different methods can be compared, or a composite (e.g., mean) velocity can be calculated, to characterize or reduce uncertainty in the relative or absolute velocity of the droplet. The velocities of multiple droplets passing through the microfluidic channel can also be measured and compared to determine the flow rate of the solution in which the droplets are suspended.

IV. Systems

Systems are also provided herein for carrying out the methods described above. A system for measuring the velocity of a droplet passing through a microfluidic channel includes a laser, a microfluidic channel, and a detector. These components can have the features discussed above. For example, the microfluidic channel can include a transparent illumination site and be interposed between the laser and the detector. The laser can be directed at the microfluidic channel and the detector, such that a laser beam emitted by the laser intersects the microfluidic channel at the illumination site and is transmitted by the microfluidic channel to the detector. In the absence of a droplet at the illumination site, the laser beam can be incident on at least two regions of the detector. In addition, the detector can generate a signal for each of these regions, the signal being proportional to the intensity of light incident on the region.

The components of a system, according to embodiments of the present invention, can be positioned and connected as desired. The system can also include a computer system for performing tasks such as signal processing or regulating the rate of flow in the microfluidic channel.

In some embodiments, the system includes a pressure source coupled to the microfluidic channel. The pressure source can control the speed at which droplets and carrier fluid pass through the channel, and, in conjunction with other equipment and fluid sources connected to the channel, the rate at which droplets increase or decrease in size. Based upon the velocity of a droplet passing through the microfluidic channel, determined according to the methods described above, the pressure can be adjusted. The result is that the system can accommodate feedback from the optical measurements to achieve a target velocity. The pressure source can be controlled as desired, for example with a computer or manually. If desired, the pressure source can be controlled automatically using inputs from the detector.

In some embodiments, the system also includes focusing optics, wherein the focusing optics are interposed between the laser and the microfluidic channel, such that a laser beam emitted by the laser is focused at the illumination site. In some embodiments of the system, the detector includes at least two non-incident regions, such that the laser beam is not incident on each non-incident region in the absence of a droplet at the illumination site, and the detector generates a signal for each non-incident region, the signal being proportional to the intensity of light incident on the non-incident region. Other features and elaborations of systems within the scope of the present application will be apparent in view of the disclosure above.

The present disclosure of systems and methods includes droplets passing through microfluidic channels. It will be recognized that the methods can be used to measure velocities or sizes of other objects, and indeed any object that can be illuminated and detected as described herein.

V. Example

A microfluidic channel having a square cross-section (20 μm on each side) was placed between a 488-nm diode laser and a detector comprising a linear photodiode array. The laser beam was shone through the microfluidic channel and onto the detector, such that the beam intersected the microfluidic channel at a transparent illumination site and was incident on two regions (a first region and a second region) of the detector. A suspension of aqueous droplets in fluorinated oil was passed through the microfluidic channel and signals for the two regions were monitored in real time. The signals were sampled at 1 MHz, and the number of counts registered by each region per 1-μs bin (i.e., per integration period) was recorded (FIG. 2). A baseline signal of 33 counts per bin was measured for the first region, and a baseline signal of 88 counts per bin was measured for the second region. As a droplet passed through the illumination site, the signal for the first region was observed to fall by 27 percent to 24 counts in bin 1050. The signal for the second region was observed to fall comparably, by 33 percent to 59 counts, in bin 1100. The 1050th and 1100th bins were identified as the first and second departure times, respectively, and an elapsed time of 50 μs between these bins was calculated. An appropriate distance of 10 μm was estimated. The appropriate distance was divided by the elapsed time to obtain a droplet velocity of 0.20 m/s.

VI. Computer Systems

Figure 5:
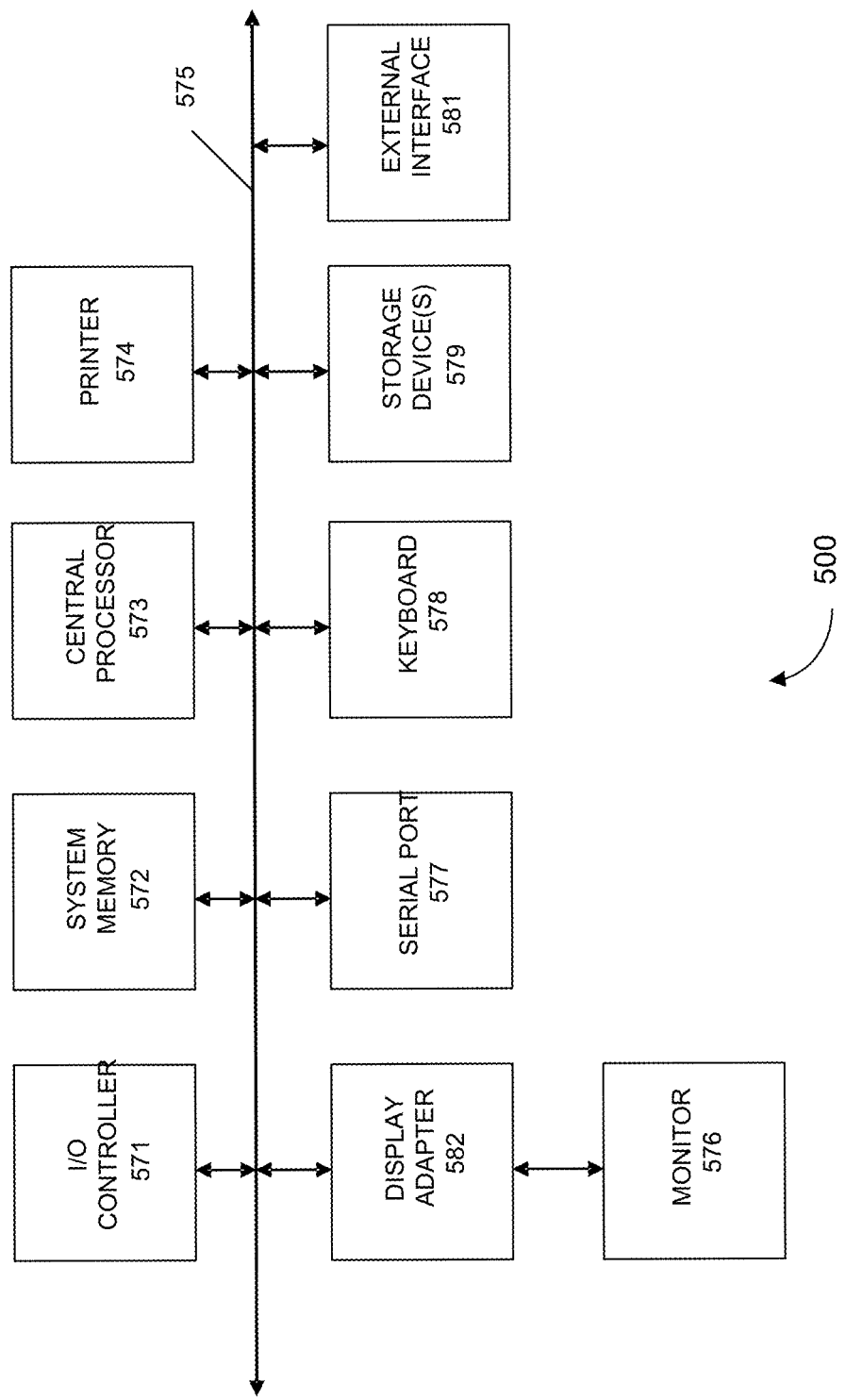
FIG. 5 shows a block diagram of a computer system 500 usable with embodiments of the present invention.

Any of the computer systems mentioned herein may utilize any suitable number of subsystems. Examples of such subsystems are shown in FIG. 5 in computer apparatus 500. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 575. Additional subsystems such as a printer 574, keyboard 578, storage device(s) 579, monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 (e.g. Ethernet, Wi-Fi, etc.) can be used to connect computer system 500 to a wide area network such as the Internet, a mouse input device, or a scanner. The interconnection via system bus 575 allows the central processor 573 to communicate with each subsystem and to control the execution of instructions from system memory 572 or the storage device(s) 579 (e.g., a fixed disk, such as a hard drive or optical disk), as well as the exchange of information between subsystems. The system memory 572 and/or the storage device(s) 579 may embody a computer readable medium. Any of the data mentioned herein can be output from one component to another component and can be output to the user.

A computer system can include a plurality of the same components or subsystems, e.g., connected together by external interface 581 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

All documents (for example, patents, patent applications, books, journal articles, or other publications) cited herein are incorporated by reference in their entirety and for all purposes, to the same extent as if each individual document was specifically and individually indicated to be incorporated by reference in its entirety for all purposes. To the extent such documents incorporated by reference contradict the disclosure contained in the specification, the specification is intended to supersede and/or take precedence over any contradictory material.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with the true scope and spirit of the invention being indicated by the following claims.

What is claimed is:

1. A method of measuring a velocity of a droplet passing through a microfluidic channel, wherein:
   the microfluidic channel is interposed between a laser and a detector, and comprises a transparent illumination site;
   the laser is directed at the illumination site and the detector; and
   the detector comprises a plurality of physically separated detection regions and is configured to generate a signal for each region, the signal being proportional to the intensity of light incident on the region,
   and the method comprises:
   while the droplet is absent from the illumination site, shining a laser beam emitted by the laser through the illumination site and onto the detector, wherein the laser beam is incident on a first region and a second region of the detector,
   measuring a first baseline signal for the first region, and measuring a second baseline signal for the second region;
   while the droplet passes through the illumination site, shining the laser beam through the illumination site and onto the detector,
   measuring a first signal for the first region, and
   measuring a second signal for the second region;
   determining a first departure time at which the first signal initially departs from the first baseline signal by a first predetermined amount;
   determining a second departure time at which the second signal initially departs from the second baseline signal by a second predetermined amount;
   calculating a difference between the first departure time and the second departure time to obtain an elapsed time; and
   determining a velocity based on the elapsed time, thereby measuring the velocity of the droplet passing through the microfluidic channel.

2. The method of claim 1, wherein the first region of the detector or the second region of the detector comprises a single pixel or photodiode.

3. The method of claim 1, wherein:
   the first signal initially departs from the first baseline signal by falling below the first baseline signal by the first predetermined amount, or
   the second signal initially departs from the second baseline signal by falling below the second baseline signal by the second predetermined amount.

4. The method of claim 1, wherein:
   the first signal initially departs from the first baseline signal by exceeding the first baseline signal by the first predetermined amount, or
   the second signal initially departs from the second baseline signal by exceeding the second baseline signal by the second predetermined amount.

5. The method of claim 1, wherein the first predetermined amount is about equal to the second predetermined amount.

\* \* \* \* \*